(12) United States Patent
Takiguchi et al.

(10) Patent No.: US 8,641,334 B2
(45) Date of Patent: Feb. 4, 2014

(54) INSERT

(75) Inventors: Syoji Takiguchi, Anpachi-gun (JP);
Akira Kanaboshi, Anpachi-gun (JP);
Kunihiro Endo, Anpachi-gun (JP)

(73) Assignee: Mitsubishi Materials Corporation,
Tokyo (JP)

( * ) Notice: Subject to any disclaimer, the term of this patent is extended or adjusted under 35 U.S.C. 154(b) by 1030 days.

(21) Appl. No.: 12/704,090

(22) Filed: Feb. 11, 2010

(65) Prior Publication Data

US 2010/0143058 A1 Jun. 10, 2010

Related U.S. Application Data

(63) Continuation-in-part of application No. 11/752,371, filed on May 23, 2007, now Pat. No. 7,862,266.

(30) Foreign Application Priority Data

Jun. 5, 2006 (JP) .................................. 2006-156367
Feb. 19, 2007 (JP) .................................. 2007-038308

(51) Int. Cl.
*B23D 77/02* (2006.01)

(52) U.S. Cl.
USPC ............... 408/145; 407/37; 407/45; 408/153; 408/181; 408/705

(58) Field of Classification Search
USPC .......... 407/36–39, 44–45; 408/153, 179, 231, 408/233, 161, 162, 168, 713, 145, 181, 705, 408/144
IPC ............... B23D 77/04,77/02, 77/00; B23C 5/24
See application file for complete search history.

(56) References Cited

U.S. PATENT DOCUMENTS 4,353,669 A 10/1982 Striegl
4,425,063 A 1/1984 Striegl (Continued)

FOREIGN PATENT DOCUMENTS

DE 3520179 A1 12/1986
DE 3232804 C1 4/1991

(Continued)

OTHER PUBLICATIONS

Notice of Allowance mailed Sep. 3, 2010 for the corresponding U.S. Appl. No. 11/752,371.

(Continued)

*Primary Examiner* — Daniel Howell
(74) *Attorney, Agent, or Firm* — Leason Ellis LLP

(57) ABSTRACT

An insert attached to a tool body of a hole machining tool having an attachment seat and a pressing member for pressing the insert to adjust the position of a peripheral cutting edge in a diameter direction of the tool. The insert has a panel shape. One surface of the insert in a thickness direction provides a seating surface, the other surface in the thickness direction provides a peripheral flank surface. A surface facing the rear side of the insert in a tool rotation direction provides a pressed surface in a state that the insert is attached to the attachment seat. A side surface facing the front side in the tool rotation direction provides an inclined surface, and a peripheral cutting edge is formed at a ridge portion outside of the inclined surface in the diameter direction of the tool.

8 Claims, 7 Drawing Sheets

(56) References Cited

U.S. PATENT DOCUMENTS

| | | | |
|---|---|---|---|
| 4,547,100 A * | 10/1985 | Naccarato et al. | 407/39 |
| 5,328,307 A * | 7/1994 | Fees et al. | 408/173 |
| 5,716,169 A | 2/1998 | Schuerfeld | |
| 5,820,308 A | 10/1998 | Hoefler | |
| 6,074,137 A | 6/2000 | Betman et al. | |
| 6,764,254 B2 | 7/2004 | Emoto et al. | |
| 6,966,729 B2 | 11/2005 | Dehn et al. | |
| 7,037,051 B2 | 5/2006 | Wermeister | |
| 7,862,266 B2 * | 1/2011 | Takiguchi et al. | 408/145 |
| 2006/0056925 A1 * | 3/2006 | Hecht et al. | 407/37 |

FOREIGN PATENT DOCUMENTS

| | | |
|---|---|---|
| DE | 4115317 | 1/1992 |
| DE | 4343404 | 6/1995 |
| DE | 10350851 A1 * | 6/2005 |
| EP | 0350389 | 1/1990 |
| EP | 0552774 A1 | 1/1993 |
| EP | 0824050 | 2/1998 |
| GB | 2244440 | 12/1991 |
| JP | 2001322029 A * | 11/2001 |
| JP | 2002/160124 | 6/2002 |
| JP | 2007-130739 A | 5/2007 |
| JP | 2008-119796 A | 5/2008 |
| JP | 2010179450 A * | 8/2010 |
| WO | WO-2005-105355 A2 | 11/2005 |

OTHER PUBLICATIONS

European Search Report mailed Feb. 14, 2012 for the corresponding European Patent Application No. EP 09 17 1082.2.

* cited by examiner

INSERT

CROSS REFERENCES TO RELATED APPLICATIONS

The present application is a Continuation-in-Part of U.S. patent application Ser. No. 11/752,371 filed May 23, 2007 which claims priority under 35 U.S.C. §119 to Japanese Patent Application No. 2006-156367 filed Jun. 5, 2006 and Japanese Patent Application No. 2007-038308 filed Feb. 19, 2007. The content of each application is incorporated herein by reference in its entirety.

BACKGROUND

1. Technical Field

The present invention relates to an insert attached to a hole machining tool which is inserted into a pilot hole formed in advance in a workpiece to cut the inner surface of the pilot hole.

2. Background Art

As such a type of hole machining tool, a reamer in which an edge portion having a cutting edge is soldered to a front end of a tool body rotating about an axis line and having a longitudinal cylindrical shape is known. The reamer rotates about the axis line, is fed in the axial direction, is inserted into a pilot hole formed in advance in a workpiece to cut the inner surface of the pilot hole with the cutting edge formed in the edge portion, thereby forming a machined hole having a predetermined inner diameter.

In such a hole machining tool in which the edge portion is soldered to the tool body, the position of the cutting edge in the diameter direction cannot be adjusted and thus the position of the cutting edge is determined by means of soldering precision. Accordingly, it is not possible to cope with the machining of a hole having a very small dimensional tolerance.

Therefore, for example, as described in JP-A-2002-160124, there is suggested an insert type reamer in which an insert having a cutting edge is detachably attached to the front end of the tool body and a positioning mechanism for adjusting a position of the cutting edge of the insert in the diameter direction of the tool body is provided. FIGS. 7 and 8 show an example of the known insert type reamer having the positioning mechanism.

The reamer 1 shown in FIGS. 7 and 8 has a tool body 2 rotating about an axis line O and having a longitudinal cylindrical shape. A recessed portion 3 opened to the front end of the tool body 2 and the outside in the diameter direction of the tool body 2 is formed in a front outer periphery of the tool body 2 and an attachment seat 4 is formed on the rear side of the recessed portion 3 in the tool rotation direction T. As shown in FIG. 8, a plurality of guide pads 5 is disposed on the outer periphery of the tool body 2 with a constant gap in the circumferential direction. A portion of the guide pads 5 interfering with the recessed portion 3 and the attachment seat 4 extend from the recessed portion 3 and the attachment seat 4 to the rear end of the tool body 2 and the other portion of the guide pads 5 extend to the front end of the tool body 2.

A panel-shaped insert 6 having a cutting edge 6A is attached to the attachment seat 4 in a state where the thickness direction thereof is matched with the tool rotation direction T, and is fixed thereto with a clamp screw 7.

The cutting edge 6A of the insert 6 is directed to the outside in the diameter direction of the tool body 2 and the front end of the tool body 2 and two adjustment screws 8 and 9 as an adjustment mechanism for adjusting the position of the insert in the diameter direction are disposed in the inside of the insert 6 in the diameter direction of the tool body 2 so as to be arranged in the axial direction O. The adjustment screw located on the rear end of the tool body 2 is a first adjustment screw 8 and the adjustment screw located on the front end of the tool body 2 is a second adjustment screw 9. The front end surfaces of the first and second adjustment screws 8 and 9 abut a surface of the insert 6 facing the inside in the diameter direction of the tool body 2. A receiving hole 10 open to the outside in the diameter direction of the tool body 2 is formed on the side of the attachment seat 4 close to the rear end of the tool body 2 and an adjustment wedge 11 for adjusting the position of the insert 6 in the axial direction O is inserted into the receiving hole 10.

The reamer 1 having the above-mentioned configuration is fitted to a primary shaft end of a machining tool, is fed to the front end in the axial direction O with the rotation about the axis line O, is inserted into a pilot hole formed in advance in a workpiece to cut the inner surface of the pilot hole with the cutting edge 6A of the insert 6, thereby forming a machined hole having a predetermined inner diameter.

At the time of performing the cutting, the guide pads 5 slide on the inner surface of the machined hole and thus prevent the fluctuation of the axis line O of the reamer 1, thereby enhancing the dimensional precision.

In the reamer 1 having the above-mentioned configuration, the inclination angle (back taper) of the cutting edge 6A formed in the insert 6 about the axis line O and the position of the cutting edge 6A in the diameter direction of the tool body 2 can be adjusted using the first adjustment screw 8 and the second adjustment screw 9, thereby forming the machined hole having a predetermined inner diameter with excellent dimensional precision. In addition, it is possible to cope with a very small dimensional tolerance of a machined hole. By appropriately attaching the back taper, it is possible to prevent unnecessary contact between the inner surface of the machined hole and the insert 6, thereby reducing cutting resistance.

DISCLOSURE OF THE INVENTION

However, in the reamer 1, since the panel-shaped insert 6 is attached in a state where the thickness direction thereof is matched with the tool rotation direction, it is necessary to open the large recessed portion 3 located on the front side of the attachment seat 4 in the tool rotation direction T. For example, in the reamer 1 shown in FIG. 8, the recessed amount of the portion recessed to the inside in the diameter direction of the tool body 2 from a section of the recessed portion 3 perpendicular to the axis line O is about ⅖ of the outer diameter of the tool body 2 (⅘ of the radius of the tool body 2) and the circumferential size of the recessed portion 3 is in the range of ⅕ to ¼ of the circumference of the tool body 2. Since the recessed portion 3 occupies a large portion of the tool body 2, the weight balance is poor in the section perpendicular to the axis line O and the movement at the time of rotating the tool body 2 about the axis line O at a high speed is not balanced. Accordingly, the position of the axis line O is disturbed, whereby a machined hole having a high circularity with excellent dimensional precision is not formed.

In order to form the large recessed portion 3 and the attachment seat 4, a plurality of guide pads 5 extend to the rear end of the tool body 2 from the recessed portion 3 and the guide pads 5 do not slide on the machined hole with good balance on the front end of the tool body 2, thereby disturbing the axis line O of the reamer 1. When the recessed portion 3 is large along the axis line O direction, the guide pads 5 are shortened, thereby increasing the disturbance of the axis line O.

It is necessary to form the recessed portion 3, the clamp screw hole 12 into which a clamp screw 7 is screwed, adjustment screw holes 13 and 13 for receiving two adjustment screws 8 and 9, and the receiving hole 10 for receiving the adjustment wedge 11 in the front end portion of the tool body 2 and portions of the tool body 2 to be cut out increase, thereby reducing the rigidity of the tool body 2. Accordingly, at the time of rotating the tool body 2 at a high speed, vibration may occur. Specifically, when the reamer 1 has a small diameter, there is no space for forming the recessed portion 3, the clamp screw hole 12, the adjustment screw holes 13, and the receiving hole 10, thereby not providing the insert type reamer having the above-mentioned adjustment mechanism.

The adjustment mechanism for adjusting the back taper and the adjustment mechanism for adjusting the position in the diameter direction of the tool body 2 are embodied by the first and second adjustment screws 8 and 9. Accordingly, for example, when the back taper is first adjusted and then the position in the diameter direction of the tool body 2, the previously adjusted back taper varies and the back taper should be adjusted again. Therefore, a great deal of time and labor is required for adjusting the insert 6 and the positioning of the insert 6 could not be performed simply and precisely.

The invention is contrived to solve the above-mentioned problems. An object of the invention is to provide an insert which is attached to a tool body of a hole machining tool, which can enhance movement balance and rigidity of the tool body by reducing the portions cut out from the tool body and which can simply adjust the position of the insert with high precision.

MEANS FOR SOLVING THE PROBLEM

In order to achieve the above-mentioned object, according to an aspect of the invention, there is provided an insert attached to a hole machining tool having a tool body rotating about an axis line, in which a recessed portion which is open to the front end of the tool body and the outside in a diameter direction of the tool body is formed, an attachment seat is formed on the rear side of the recessed portion in a tool rotation direction, and a pressing member for pressing a pressed surface of the insert to adjust a position of a peripheral cutting edge in the diameter direction of the tool body is disposed on the rear side of the attachment seat in the tool rotation direction, wherein one surface in the thickness direction of the insert having a panel shape becomes a seating surface which is seated on a wall surface of the attachment seat, facing the outside in the diameter direction, disposed in the tool body and the other surface in the thickness direction becomes a peripheral flank surface facing the outside in the diameter direction of the tool body, wherein a surface of the insert facing the rear side in the tool rotation direction becomes the pressed surface in a state that the insert attached to the attachment seat, a side surface of the insert facing the front side in the tool rotation direction becomes an inclined surface, and a peripheral cutting edge is formed at a ridge portion of the inclined surface on the outside in the diameter direction of the tool body, and wherein the pressed surface intersects the seating surface at an obtuse angle.

In the insert having the above-mentioned configuration, it is possible to adjust the position of the peripheral cutting edge of the insert disposed on the outside in the diameter direction of the tool body by moving the insert to the front side in the tool rotation direction by the use of the pressing member disposed on the rear side in the tool rotation direction. That is, the pressed surface of the insert intersects the seating surface at an obtuse angle and gradually protrudes to the rear side in the tool rotation direction as it goes to the outside of the diameter direction of the tool body. Accordingly, by pressing the pressed surface, the insert moves to the front side in the tool rotation direction along the wall surface of the attachment seat facing the outside in the diameter direction of the tool body.

Since a so-called longitudinal insert having a panel shape, in which the thickness direction thereof is matched with the diameter direction of the tool body, the surface thereof facing the front side in the tool rotation direction becomes the inclined surface, and the peripheral cutting edge is formed in the ridge portion of the inclined surface on the outside in the diameter direction of the tool body, is attached as the insert, it is possible to seat the insert in a state where the thickness direction thereof is approximately matched with the diameter direction of the tool body, to reduce the portions cut out from the tool body so as to form the attachment seat, and to reduce the size of the recessed portion located on the front side of the attachment seat in the tool rotation direction.

Since the pressing member can be disposed on the rear side of the attachment seat in the tool rotation direction, it is possible to reduce the portions cut out from the tool body. Therefore, it is possible to enhance the movement balance and the rigidity of the tool body and to prevent the vibration of the tool body, thereby forming the machined hole with high precision. Even with a hole machining tool for forming a machined hole with a small diameter, it is possible to construct a hole machining tool with an insert of which the diameter can be adjusted.

The portions for forming the recessed portion and the attachment seat can be reduced in size. Accordingly, for example, when the guide pads are disposed on the outer periphery of the tool body, the portions interfering with the recessed portion and the attachment seat are reduced and the guide pads can be disposed to the vicinity of the front end of the tool body with good balance. In addition, the disturbance of the axis line of the tool body can be satisfactorily prevented by means of sliding between the machined hole and the guide pads, thereby forming a machined hole having a high circularity.

By using an insert having a cutting edge portion formed of a diamond-sintered body and having the peripheral cutting edge formed in the cutting edge portion as the above-mentioned insert, it is possible to enhance the wear resistance of the cutting edge, thereby extending the lifetime of the insert.

The cutting edge portion has a panel shape and a thickness direction thereof is disposed so as to face a flank surface connected to the bevel edge of the insert. Accordingly, when regrinding is performed, grinding is carried out along the inclined surface and variation of an axial position of the bevel edge becomes very small. Whereby, positional adjustment of the bevel edge after regrinding can be performed simply.

DESCRIPTION OF REFERENCE NUMERALS AND SIGNS

20: REAMER (HOLE MACHINING TOOL)
21: TOOL BODY
30: RECESSED PORTION
31: ATTACHMENT SEAT
31B: WALL SURFACE FACING OUTSIDE IN DIAMETER DIRECTION OF TOOL BODY
32: CLAMP SCREW HOLE
36: NOTCH
40: PRESSING PIN (PRESSING MEMBER)
40A: PRESSING SURFACE
41: PRESSING SCREW
42: ADJUSTMENT SCREW (ADJUSTMENT MEMBER)
50: INSERT
51: SEATING SURFACE
54: INCLINED SURFACE
55: CUTTING EDGE PORTION
56: PERIPHERAL CUTTING EDGE
59: BEVEL CUTTING EDGE
61: PRESSED SURFACE
70: CLAMP SCREW

DETAILED DESCRIPTION OF THE INVENTION

By forming the cutting edge portion in a panel shape and disposing the thickness direction thereof toward the flank surface extending from the bevel cutting edge, the re-grinding is performed along the inclined surface, thereby greatly reducing the variation in position in the axial direction of the bevel cutting edge. Therefore, it is possible to simply adjust the position of the bevel cutting edge in the axial direction after the re-grinding.

By fitting the back taper to the peripheral cutting edge so that it gradually retreats to the inside in the diameter direction of the tool body as it goes to the rear end of the tool body, it is not necessary to adjust the back taper of the peripheral cutting edge. Therefore, since only the position of the peripheral cutting edge in the diameter direction can be adjusted by operating the pressing member, it is possible to simply adjust the position of the insert with high precision.

ADVANTAGE OF THE INVENTION

According to the invention, it is possible to provide an insert which is attached to a tool body of a hole machining tool, which can enhance movement balance and rigidity of the tool body by reducing portions cut out from the tool body, and which can simply adjust the position of the insert with high precision.

BEST MODE FOR CARRYING OUT THE INVENTION

Figure 1:
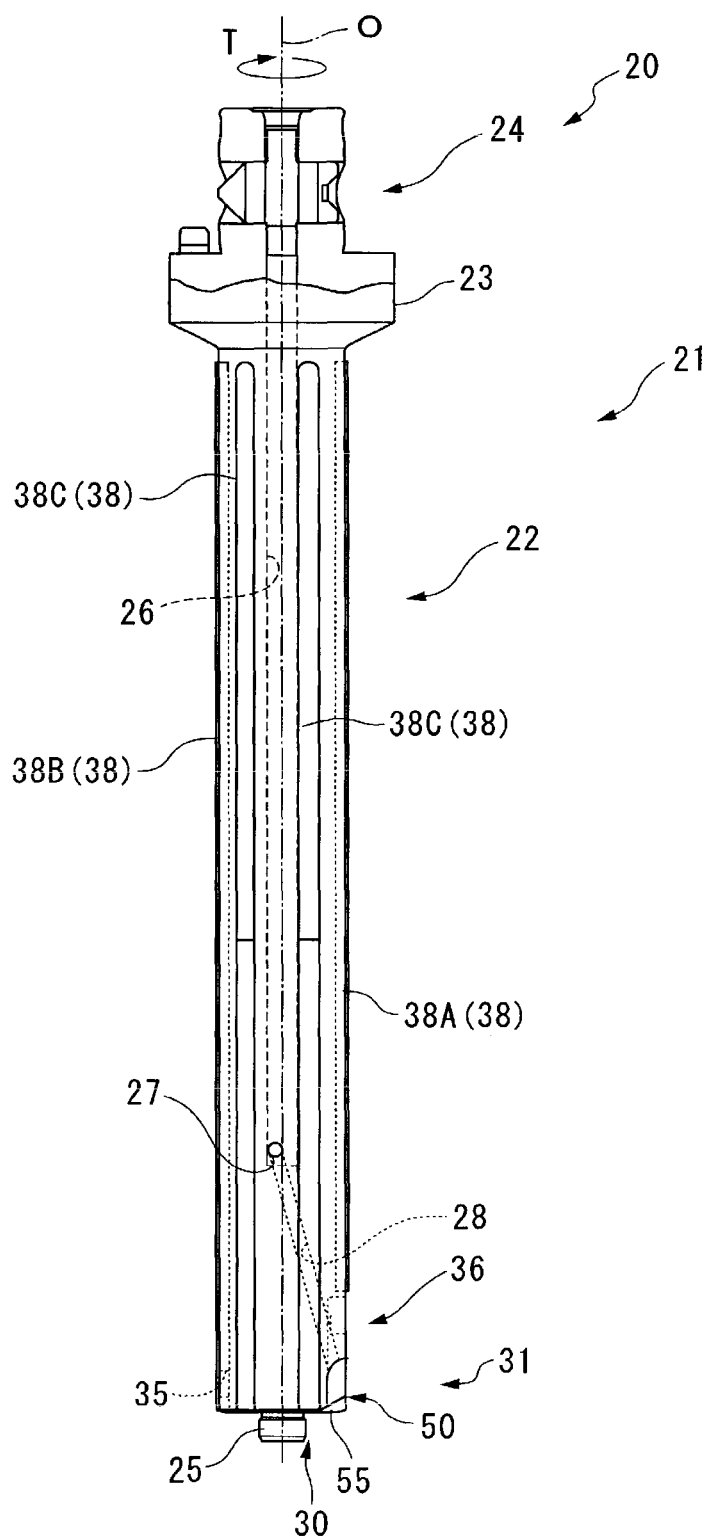
FIG. 1 is a side view of an insert according to a first embodiment of the invention and a reamer having the insert attached thereto.
Figure 2:
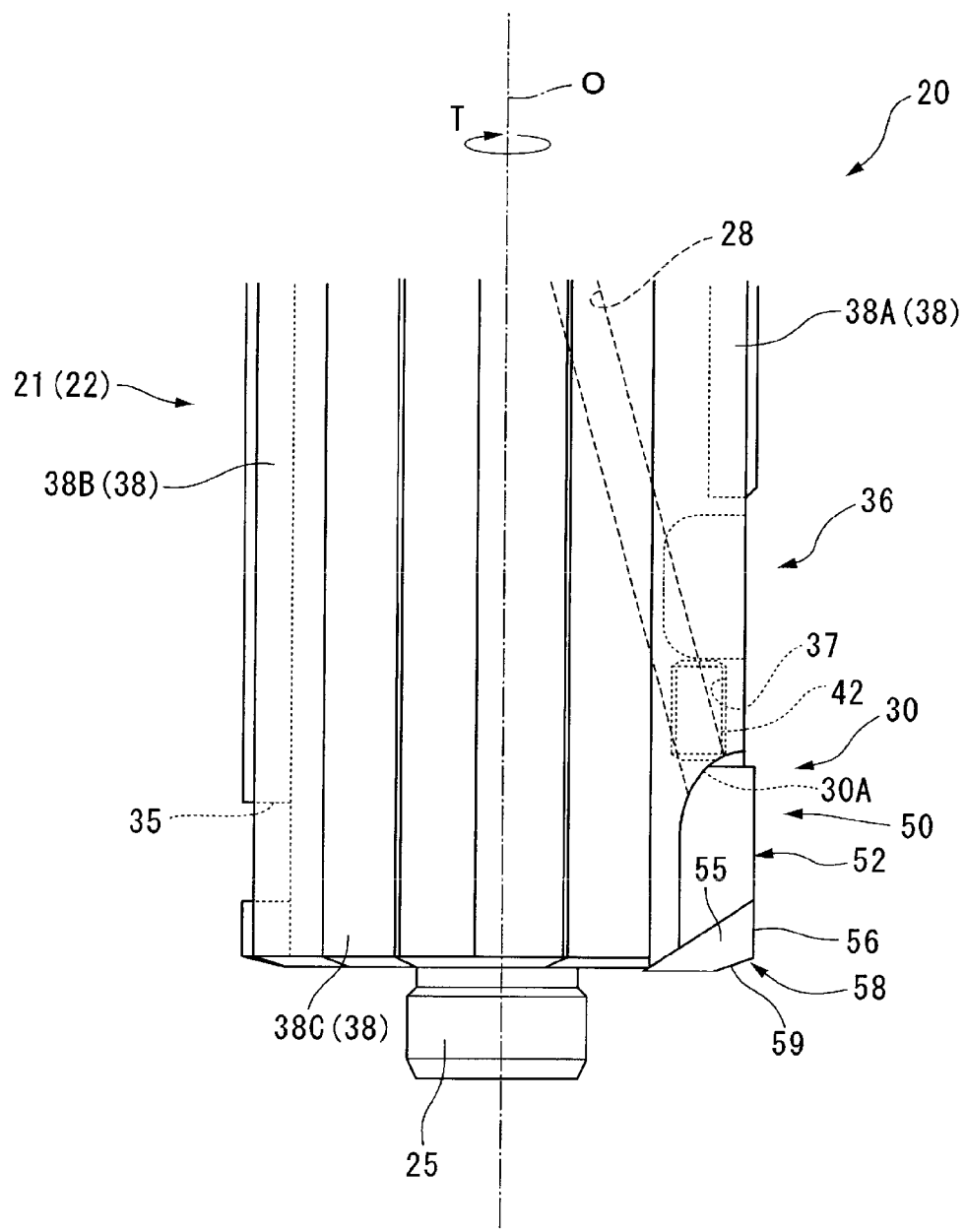
FIG. 2 is an enlarged partial sectional view of a front end portion of the reamer shown in FIG. 1.
Figure 3:
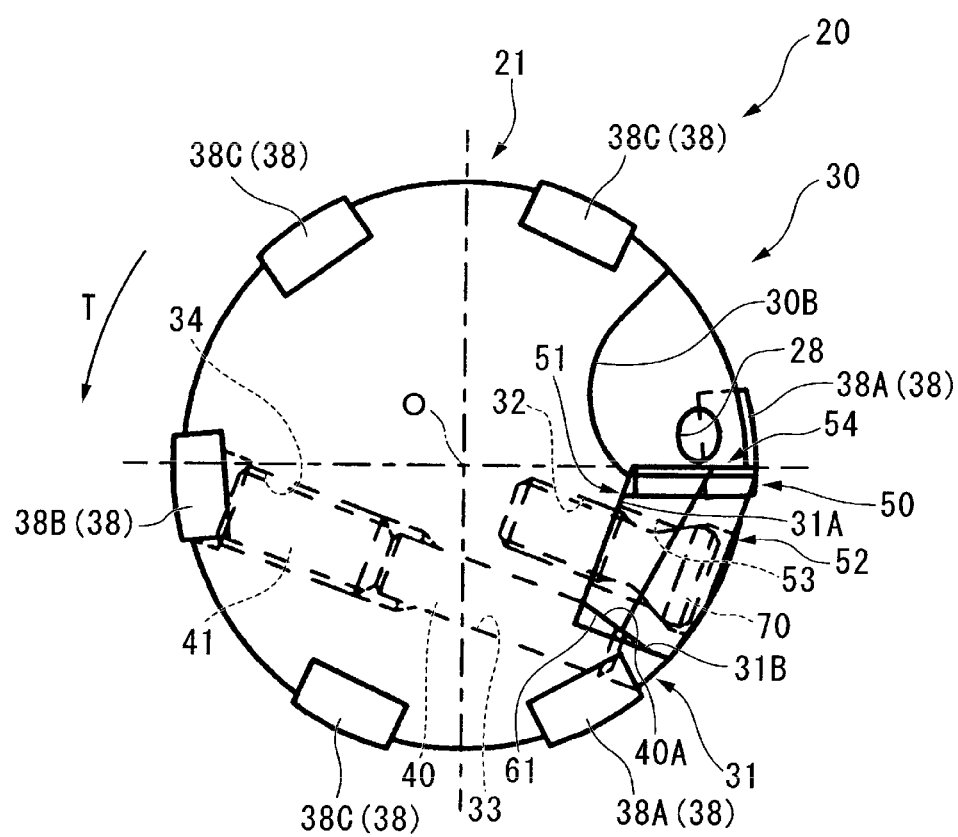
FIG. 3 is a sectional view of the reamer shown in FIG. 1.

Hereinafter, an insert and a hole machining tool having the insert attached thereto according to a first embodiment of the invention will be described with reference to the accompanying drawings. A reamer as the hole machining tool according to the exemplary embodiment of the invention is shown in FIGS. 1 to 3.

The reamer 20 according to this embodiment has a tool body 21 having a multi-stepped cylindrical shape about an axis line O. The front end (lower end in FIG. 1) of the tool body 21 becomes a machining section 22 having an approximately cylindrical shape and a guard section 23 having a diameter larger than the machining section 22 is formed on the rear end (upper end in FIG. 1) of the tool body 21. An attachment section 24 to which a tool holder (not shown) for fitting the reamer 20 to a primary shaft end of a machining tool is formed on the further rear end of the guard section 23.

A pilot 25 having a diameter smaller than that of the machining section 22 is disposed on the front end surface of the tool body 21.

A coolant supply hole 26 extending from the attachment section 24 along the axis line O and reaching a portion retreating by about $1/5$ of the entire length of the machining section 22 from the front end surface of the tool body 21 is formed in the tool body 21 and a coolant ejecting hole 27 extending from the coolant supply hole 26 to the outside in the diameter direction of the tool body 21 and being open from the outer peripheral surface of the tool body 21 is formed in the tool body 21.

A recessed portion 30 opened to the front end of the tool body 21 and the outside in the diameter direction is formed on the front end of the tool body 21 (machining section 22). As shown in FIG. 2, a wall surface 30A of the recessed portion 30 close to the rear end of the tool body 21 forms a concave-curved surface shape which is recessed to the inside in the diameter direction of the tool body 21 and the rear end of the tool body 21. A coolant discharging hole 28 extending from the coolant ejecting hole 27 to the front end side in the diameter direction of the tool body 21 and the rear in a tool rotation direction T opens in the wall surface 30A.

In this embodiment, as shown in FIG. 3, in the section perpendicular to the axis line O, the recessed portion 30 forms a concave-curved line shape which is recessed to the inside in the diameter direction of the tool body 21 and extends in parallel to the axis line O to the rear end of the tool body 21. The amount of the bottom 30B (portion most recessed to the inside in the diameter direction) the concave-curved line recessed from the outer peripheral surface of the tool body 21 is about $1/3$ of the outer diameter of the tool body 21 ($2/3$ of the radius of the tool body 21) and the size of the recessed portion 30 in the circumferential direction is about $1/8$ of the outer circumference of the tool body 21. The length of the recessed portion 30 in the direction of the axis line O is about $1/20$ of the entire length of the machining section 22, as shown in FIG. 1.

An attachment seat 31 for detachably seating an insert 50 to be described later is formed on the rear side of the recessed portion 30 in the tool rotation direction T. The attachment seat 31 has a wall surface 31A facing the outside in the diameter direction of the tool body 21 and the wall surface 31A is connected to one end (the rear end in the tool rotation direction T) of the concave-curved line forming the recessed portion 30, as shown in FIG. 3.

The wall surface 31A of the attachment seat 31 facing the outside in the diameter direction of the tool body 21 is formed so that the distance in the diameter direction from the axis line O increases as it goes to the front side from the rear side in the tool rotation direction T, as shown in FIG. 3, in the section perpendicular to the axis line O and so that the wall surface 31A extends parallel to the axis line O, as shown in FIG. 2, in the side view of the tool body 21. A clamp screw hole 32 extending in the direction perpendicular to the axis line O is formed in the wall surface 31A.

A pin hole 33 which opens in the wall surface of the attachment seat 31 facing the front side in the tool rotation direction T and which extends in a direction substantially perpendicular to the direction in which the wall surface 31A facing the outside in the diameter direction of the tool body 21 is formed on the rear side of the attachment seat 31 in the tool rotation direction T. A pressing screw hole 34 extending coaxially with the pin hole 33 is formed on the opposite side of the pin hole 33 of the attachment seat 31. The pressing screw hole 34 has a diameter larger by one step than that of the pin hole 33 and a female screw is formed on the inner peripheral surface. A large-diameter hole 35 which communicates with the pressing screw hole 34 and is opened in the outer peripheral surface of the tool body 21 is formed in the tool body 21.

A pressing pin 40 having an approximately cylindrical shape is inserted into the pin hole 33 and a pressing surface 40A protruding to the attachment seat 31 toward the front side in the tool rotation direction T is formed at the front end of the pressing pin 40. The pressing surface 40A is inclined about the axis line of the pressing pin 40 so as to gradually go to the inside of the pressing pin 40 as it goes to the front end side of the pressing pin 40.

A pressing screw 41 having an approximately cylindrical shape and having a male screw formed on the outer peripheral surface is screwed into the pressing screw hole 34 and the front end surface of the pressing screw 41 abuts the rear end surface of the pressing pin 40. An engagement hole (not shown), to engage with a working tool such as a wrench is formed in the rear end surface of the pressing screw 41 and the engagement hole opens toward the outer peripheral surface of the tool body 21 through the large-diameter hole 35.

A notch 36 opened toward the outside in the diameter direction of the tool body 21 is formed on the side of the recessed portion 30 close to the rear end of the tool body 21 and a screw through hole 37 extending to the attachment seat 31 is formed in the surface of the notch 36 facing the rear end of the tool body 21. An adjustment screw 42 having an approximately cylindrical shape and having a male screw formed on the outer peripheral surface thereof is screwed into the screw through hole 37.

A plurality of guide pads 38 which is formed of a hard material of which an outer shape is an approximately elliptical panel shape is disposed on the outer periphery of the machining section 22 of the tool body 21 so as to extend parallel to the axis line O and six guide pads 38 are disposed with a constant pitch in the circumferential direction as shown in FIG. 3 in this embodiment. As shown in FIG. 1, the guide pad 38A disposed in a portion interfering with the recessed portion 30, the attachment seat 31, and the notch 36 extends to the rear end of the tool body 21 of the notch 36 and the guide pad 38B disposed in a portion interfering with the large-diameter hole 35, is divided into two portions at the front end and the rear end of the tool body 21 with the large-diameter hole 35 therebetween. The other guide pads 38C extend to the front end surface of the tool body 21.

Next, the insert 50 which is detachably attached to the attachment seat 31 of the tool body 21 will be described.

The insert 50 has an approximately rectangular plane shape as shown in FIGS. 2 and 3 and has two faces facing the thickness direction thereof and four side faces. One face facing the thickness direction of the insert 50 becomes a seating surface 51 which is seated on the wall surface 31A of the attachment seat 31 facing the outside in the diameter direction of the tool body 21 toward the inside in the diameter direction of the tool body 21. The other face facing the thickness direction becomes a peripheral flank surface 52 toward the outside in the diameter direction of the tool body 21.

An insertion hole 53 penetrating the insert 50 in the thickness direction is formed in one face (seating surface 51) and the other face (peripheral flank surface 52).

One side face of the insert 50 becomes the inclined surface 54 toward the front side in the tool rotation direction T and a panel-shaped cutting edge portion 55 formed of a diamond-sintered body is disposed on one end (front end of the tool body 21) of the side face forming the inclined surface 54. A peripheral cutting edge 56 is formed at an intersection ridge portion between the cutting edge portion 55 and the other face (peripheral flank surface 52) facing the thickness direction, thereby forming a longitudinal-edge insert 50. The inclined surface 54 is disposed so as to intersect the seating surface 51 at an obtuse angle as shown in FIG. 3.

In the state where the insert is attached to the attachment seat 31, a chamfered portion 58 is formed at the intersection between the side face opposed to the front end of the tool body 21 and the other face as the peripheral flank surface 52 and a bevel edge 59 is formed at the intersection ridge portion between the chamfered portion 58 and the cutting edge portion 55. That is, as shown in FIG. 2, as viewed from the side opposite to the inclined surface 54, the bevel edge 59 inclined to retreat to the inside in the diameter direction of the tool body 21 as it goes to the front end of the tool body 21 is connected to the side of the peripheral cutting edge 56 close to the front end of the tool body 21.

The side face opposite to the side face as the inclined surface 54, that is, the side face facing the rear side in the tool rotation direction T, becomes a pressed surface 61 abutting the pressing surface of the pressing pin. The pressed surface 61 is formed so as to intersect the seating surface 51 at an obtuse angle and so as to protrude to the rear side in the tool rotation direction T as it goes to the outside in the diameter direction of the tool body 21. Accordingly, the section of the insert 50 perpendicular to the axis line O has an approximately trapezoid shape when being attached to the attachment seat 31, as shown in FIG. 3.

The peripheral flank surface 52 facing the outside in the diameter direction of the tool body 21 is inclined about the axis line O so as to be directed to the inside in the diameter direction of the tool body 21 as it goes toward the rear end of the tool body 21, as shown in FIG. 2, as viewed from the side opposite to the inclined surface 54 and the back taper is attached to the peripheral cutting edge 56 formed at the intersection ridge portion between the peripheral flank surface 52 and the cutting edge portion 55 so as to be directed to the inside in the diameter direction of the tool body 21 as it goes to the rear end of the tool body 21. In this embodiment, the amount of back taper is set in the range of 40 µm/15 mm to 80 µm/15 mm and more specifically 60 µm/15 mm.

The insert 50 having the above-mentioned configuration is attached to the attachment seat 31 of the tool body 21 as follows. The insert 50 is seated on the attachment seat 31 so that the inclined surface 54 is directed to the front side in the tool rotation direction T and the one face (seating surface 51) in the thickness direction of the insert 50 abuts the wall surface 31A of the attachment seat 31 facing the outside in the diameter direction of the tool body 21. Here, the pressed surface 61 of the insert 50 abuts the pressing surface 40A of the pressing pin 40 and the side face of the insert 50 facing the rear end of the tool body 21 abuts the front end of the adjustment screw 42. In this state, by screwing the clamp screw 70 inserted into the insertion hole 53 into the clamp screw hole 32 opened in the wall surface 31A of the attachment seat 31 facing the outside in the diameter direction of the tool body 21, the insert 50 is attached to the attachment seat 31.

The reamer 20 constructed by attaching the insert 50 to the attachment seat 31 of the tool body 21 in this way is fitted to the primary shaft end of a machining tool through a tool holder mounted on the attachment section 24, is fed to the front end in the direction of the axis line O with the rotation about the axis line O, is inserted into the pilot hole formed in advance in a workpiece, to cut the inner surface of the pilot hole by the use of the bevel edge 59, and the peripheral cutting edge 56, thereby forming a machined hole having a predetermined inner diameter.

At the time of performing the cutting process, the coolant supplied from the machining tool is ejected toward the inner surface of the machined hole from the coolant ejecting hole 27 through the coolant supply hole 26 so as to smoothen the sliding between the guide pads 38 and the inner surface of the machined hole and the coolant is discharged toward the insert 50 from the coolant discharging hole 28 to cool the peripheral cutting edge 56 and the bevel edge 59, thereby satisfactorily performing the cutting process.

Here, the positioning of the insert 50 in the reamer 20 is performed as follows. A working tool is allowed to engage with the engagement hole exposed from the outer peripheral surface of the tool body 21 through the large-diameter hole 35, the pressing screw 41 is inserted thereto, and then the pressing pin 40 is allowed to move to the attachment seat 31. Then, since the pressed surface 61 of the insert 50 protrudes to the rear side in the tool rotation direction T as it goes to the outside in the diameter direction of the tool body 21 so as to intersect the seating surface 51 abutting the wall surface 31A at an obtuse angle, the pressing surface 40A presses the pressed surface 61 and thus the insert 50 moves to the front side in the tool rotation direction T along the wall surface 31A of the attachment seat 31 facing the outside in the diameter direction of the tool body 21. Here, since the wall surface 31A of the attachment seat 31 facing the outside in the diameter direction of the tool body 21 is disposed so that the distance from the axis line O in the diameter direction gradually increases as it goes to the front side from the rear side in the tool rotation direction T, as shown in FIG. 3, in the section perpendicular to the axis line O, the insert 50 protrudes to the outside in the diameter direction of the tool body 21.

Accordingly, by adjusting the pressing force of the pressing pin 40 on the insert 50 by the use of the pressing screw 41, it is possible to adjust the position of the peripheral cutting edge 56 in the diameter direction of the tool body 21.

The peripheral flank surface 52 of the insert 50 retreats to the inside in the diameter direction of the tool body 21 as it goes to the rear end of the tool body 21, the back taper is attached to the peripheral cutting edge 56 already, and the amount of back taper does not vary even when the insert 50 moves to the front side in the tool rotation direction T. Accordingly, it is not necessary to adjust the back taper of the peripheral cutting edge 56.

In this way, in the reamer 20 according to this embodiment, since it is necessary to adjust the position of the peripheral cutting edge 56 in only the diameter direction by operating the pressing screw 41, it is possible to simply and precisely adjust the position of the insert 50.

The so-called longitudinal-edge insert is attached as the insert 50 having a quadrangular tabular shape, in which the one face in the thickness direction is used as the seating surface 51 facing the inside in the diameter direction of the tool body 21, the other face in the thickness direction is used as the peripheral flank surface 52 facing the outside in the diameter direction of the tool body 21, the side face facing the front side in the tool rotation direction T is used as the inclined surface 54, and the peripheral cutting edge 56 is formed at the intersection ridge portion between the inclined surface 54 and the peripheral flank surface 52. Accordingly, the insert 50 can be attached to the tool body 21 in the state where the thickness direction of the insert 50 is approximately matched with the diameter direction of the tool body 21, thereby reducing the portions cut out from the tool body 21 so as to form the attachment seat 31 and reducing the recessed portion 30 located on the front side in the tool rotation direction T of the attachment seat 31. Accordingly, the movement balance and the rigidity of the tool body 21 can be enhanced, thereby preventing the vibration of the tool body 21 and forming a machined hole with high dimensional precision. It is possible to construct an insert type hole machining tool capable of adjusting the diameter thereof in a reamer for forming a machined hole having a small diameter.

Here, in this embodiment, the amount of the bottom 30A (the portion most recessed to the inside in the diameter direction) of the concave-curved line formed by the section of the recessed portion 30 perpendicular to the axis line O recessed from the outer peripheral surface of the tool body 21 is about ⅓ of the outer diameter of the tool body 21 (⅔ of the radius of the tool body 21) and is small relative to the tool body 21. Accordingly, two guide pads 38A out of the six guide pads 38 formed on the periphery of the machining section 22 can be formed to extend to the rear end of the tool body 21 from the recessed portion 30 and the attachment seat 31, the guide pad 38B disposed in the portion in which the large-diameter hole 35 is formed can be divided into two portions by the large-diameter hole 35 and can extend to the front end of the tool body 21, and the other three guide pads 35C can be formed to extend to the front end surface of the tool body 21.

Since the length of the recessed portion 30 in the direction of the axis line O is 1/20 of the entire length of the machining section 22, the guide pad 38A disposed from the recessed portion 30 and the attachment seat 21 to the rear end of the tool body 31 can extend to the vicinity of the tool body 21.

Since the guide pads 38 can be disposed in this way, the machined hole and the guide pads 38 can be allowed to slide with good balance in the vicinity of the insert 50 for performing the cutting process and the disturbance of the axis line O of the reamer 20 can be surely prevented, thereby forming the machined hole having a high circularity with high dimensional precision. Since a machined hole having a high circularity can be formed, the reamer 20 can be used to machine a machined hole (for example, a cam hole of an engine) which requires a high dimensional tolerance which could not be machined with the known reamer 20, thereby efficiently forming the machined hole.

Since a notch 36 is formed in the portion of the attachment seat 31 close to the rear end of the tool body 21 and the adjustment screw 42 screwed into the screw through hole 37 formed in the surface of the notch 36 facing the rear end of the tool body 21 abuts the side face of the insert 50 facing the rear end of the tool body 21, it is possible to adjust the protrusion amount (advance amount) of the bevel edge 59 of the insert 50 protruding from the front end surface of the tool body 21 toward the front end of the tool body 21.

Since the cutting edge portion 55 formed of a diamond-sintered body is formed in the insert 50 and the peripheral cutting edge 56, and the bevel edge 59 are formed in the cutting edge portion 55, it is possible to improve the wear resistance of the peripheral cutting edge 56, and the bevel edge 59, thereby extending the lifetime of the insert 50.

An insert and a hole machining tool having the insert attached thereto according to the second embodiment of the invention will be described with reference to FIGS. 4 to 6. The same elements as in the first embodiment are referenced by the same reference numerals or signs and detailed description thereof will be omitted.

Figure 4:
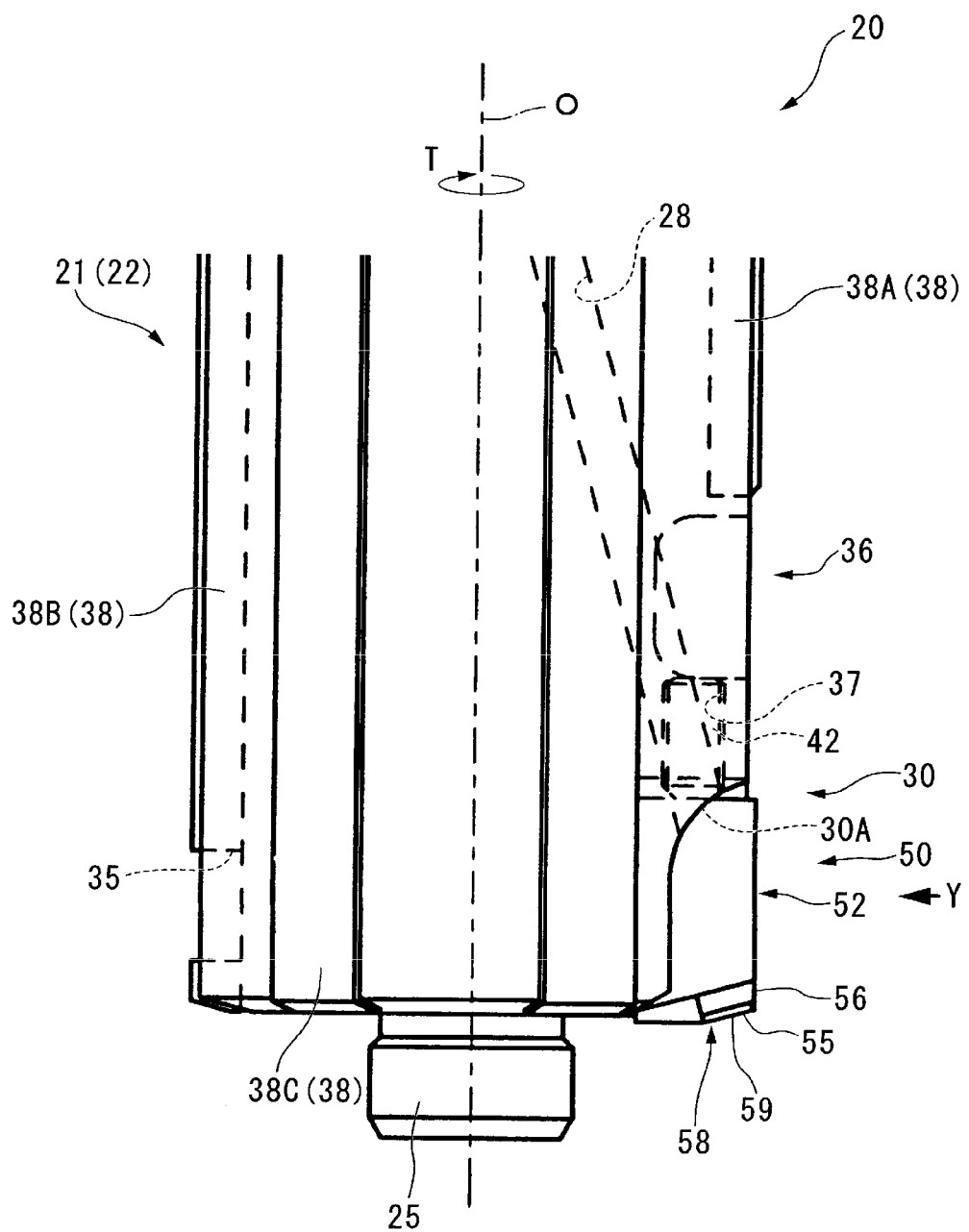
FIG. 4 is an enlarged partial sectional view of an insert according to a second embodiment of the invention and a front end portion of a reamer having the insert attached thereto.
Figure 5:
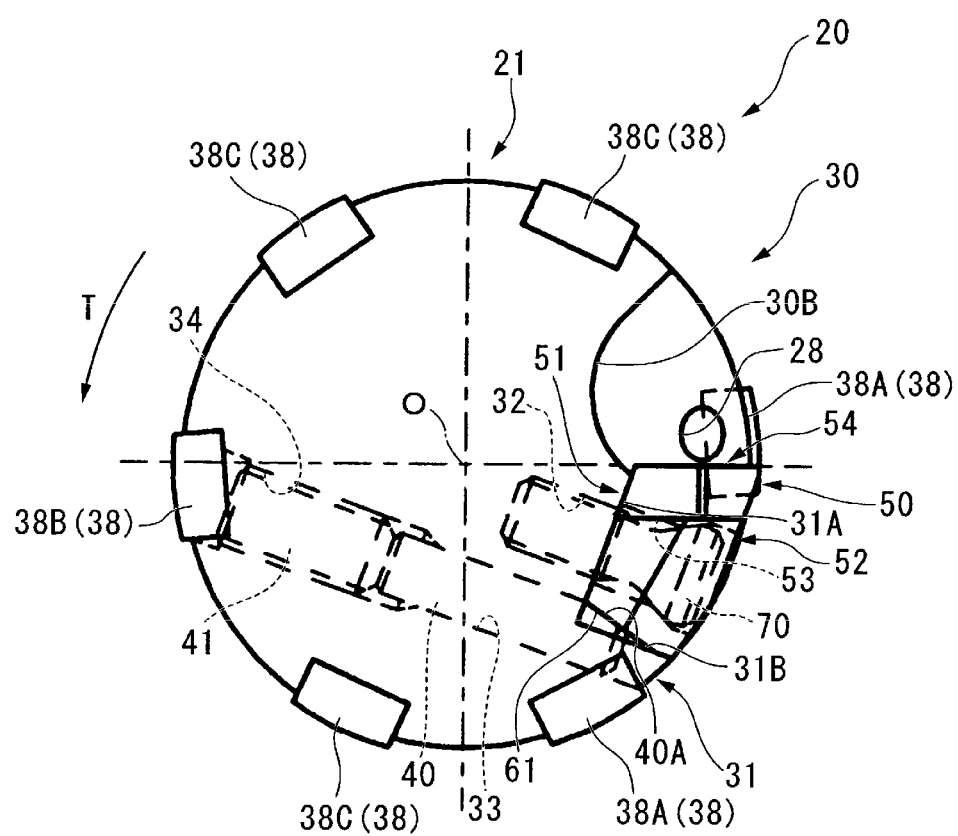
FIG. 5 is a sectional view of the reamer shown in FIG. 4.
Figure 6:
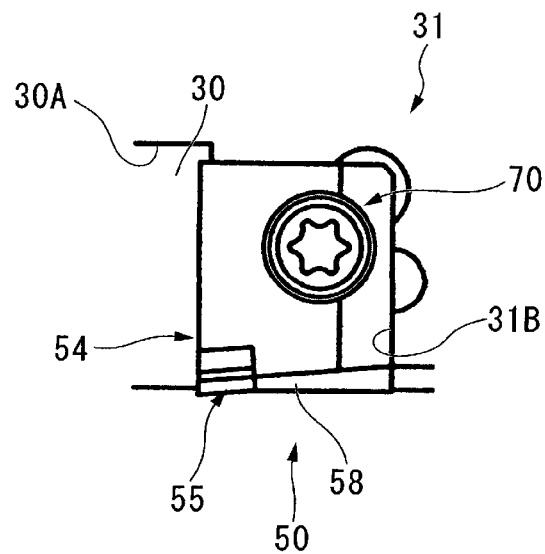
FIG. 6 is a view as viewed in a direction of arrow Y in FIG. 4.
Figure 7:
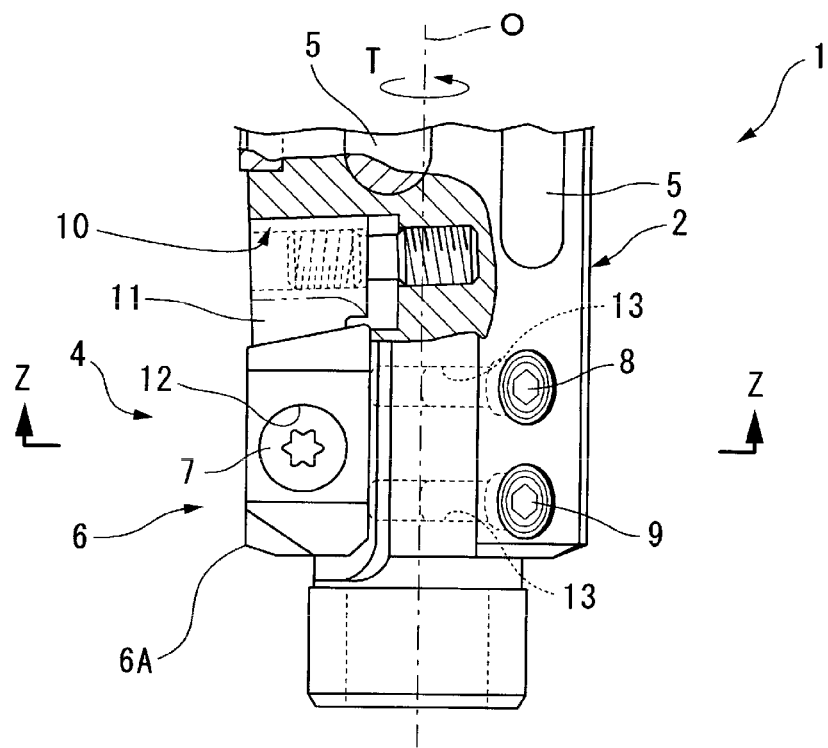
FIG. 7 is an enlarged partial sectional view of a front end portion of a known reamer.
Figure 8:
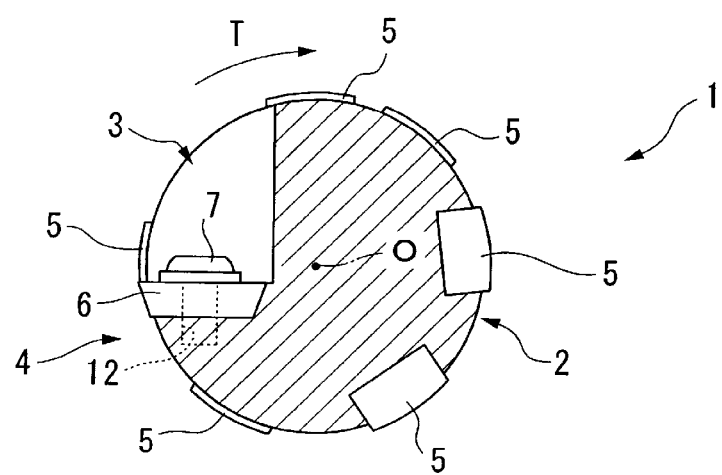
FIG. 8 is a sectional view taken along line z-z of FIG. 7.

As shown in FIGS. 4 and 6, in an insert 50 according to the second embodiment, the cutting edge portion 55 formed of the diamond-sintered body has approximately a panel shape and the cutting edge portion 55 is stacked on a chamfered portion 58 extending from the bevel cutting edge 59 of the insert 50.

In the hole machining tool having such configuration, when the bevel edge 59 and the peripheral cutting edge 56 are worn and need be to re-ground, the re-grinding is performed along the inclined surface 54, thereby reducing the variation in position of the bevel cutting edge 59 in the axial direction. Therefore, by slightly pressing the insert 50, by the use of the adjustment screw 42, after the re-grinding, it is possible to adjust the position of the bevel cutting edge 59 in the axial direction. The amount of the cutting edge portion 55, formed of a diamond-sintered body, to be re-ground is small.

It is known that a surface roughness of the diamond-sintered body not ground is three times better. In this embodiment, since a portion of the cutting edge portion 55 having good surface roughness is disposed in the flank surface extending from the bevel cutting edge 59 and thus the frictional resistance is reduced, the wear of the cutting edge portion 55 is suppressed, thereby extending the lifetime of the insert 50.

Although the insert and the hole machining tool having the insert attached thereto according to the embodiments of the invention have been described, the invention is not limited to the embodiments, but may be modified in various forms without departing from the technical spirit of the invention.

For example, although the reamer in which the guard section and the attachment section are provided on the rear end of the tool body has been described, the present invention is not limited to this reamer configuration, but may have a reamer configuration in which the tool body has substantially a constant outer diameter over the entire length without the guard section and the rear end portion of the tool body is inserted into a fitting hole formed in a cutting tool.

Although it has been described that 6 guide pads are disposed with a constant pitch in the circumferential direction, the present invention is not limited to it, but the arrangement and number of the guide pads may be appropriately selected in consideration of the cutting condition, etc.

Although it has been described that the pressing pin is provided as the pressing member, the present invention is not limited to it, but another pressing member such as a wedge member may be provided.

Although it has been described that the adjustment screw is provided as the adjustment member for adjusting the protrusion amount (advance amount) of the bevel edge protruding from the front end surface of the tool body, the present invention is not limited to it, but another adjustment member such as a wedge member may be provided or the adjustment member may not be provided.

Although it has been described that the amount of the back taper provided in the peripheral cutting edge facing the outside in the diameter direction of the tool body is in the range of 40 µm/15 mm to 80 µm/15 mm and more specifically 60 µm/15 mm, the present invention is not limited to it, but the amount of the back taper may be appropriately set in consideration of the cutting condition, etc. However, it is preferable that, by setting the amount of back taper in the above-mentioned range, since it is possible to satisfactorily prevent the inner surface of the machined hole and the rear end portion of the peripheral cutting edge from sliding and thus to smoothly finish the inner surface of the machined hole.

Although it has been described that the insert has the cutting edge portion formed of a diamond-sintered body, the insert may have a cutting edge portion integrally formed of cemented carbide or formed of a cBN-sintered body.

What is claimed is:

1. An insert attached to a hole machining tool having a tool body rotating about an axis line, comprising;
   a recessed portion that is formed to be open at a front end of the tool body and open to the outside in a diameter direction of the tool body;
   an attachment seat that is formed on a rear side of the recessed portion in a tool rotation direction; and
   a pressing member for pressing a pressed surface of the insert to adjust a position of a peripheral cutting edge in the diameter direction of the tool body, the pressing member being disposed on the rear side of the attachment seat in the tool rotation direction,
   wherein one surface in the thickness direction of the insert having a panel shape forms a seating surface which is seated on a wall surface of an attachment seat of the tool, facing outwardly in the diameter direction of the tool body and disposed in the tool body, and the other surface in the thickness direction becomes a peripheral flank surface facing outwardly in the diameter direction of the tool body,
   wherein a surface of the insert facing a rear side in the tool rotation direction forms a pressed surface in a state in which the insert is attached to the attachment seat, a side surface of the insert facing the front side in the tool rotation direction forms an inclined surface, and a peripheral cutting edge is formed at a ridge portion of an inclined surface facing outside in the diameter direction of the tool body, and
   wherein the pressed surface intersects the seating surface at an obtuse angle.

2. The insert according to claim 1, wherein one end of the inclined surface is provided with a cutting edge portion formed of a diamond-sintered body and the peripheral cutting edge is formed in the cutting edge portion.

3. The insert according to claim 2, wherein a beveled cutting edge is formed at the ridge portion of the inclined surface in proximity to the front end of the tool body and the peripheral cutting edge and the bevel cutting edge are formed in the cutting edge portion.

4. The insert according to claim 3, wherein the cutting edge portion has a panel shape and the thickness direction thereof is directed to a flank surface extending from the bevel cutting edge.

5. The insert according to claim 1, wherein, in a state where the insert is attached to the attachment seat of the tool body, a back taper is fitted to the peripheral cutting edge that gradually retreats inwardly in the diameter direction of the tool body and toward a rear end of the tool body.

6. The insert according to claim 2, wherein, in a state where the insert is attached to the attachment seat of the tool body, a back taper is fitted to the peripheral cutting edge that gradually retreats inwardly in the diameter direction of the tool body and toward a rear end of the tool body.

7. The insert according to claim 3, wherein, in a state where the insert is attached to the attachment seat of the tool body, a back taper is fitted to the peripheral cutting edge that gradually retreats inwardly in the diameter direction of the tool body and toward a rear end of the tool body.

8. The insert according to claim 4, wherein, in a state where the insert is attached to the attachment seat of the tool body, a back taper is fitted to the peripheral cutting edge that gradually retreats inwardly in the diameter direction of the tool body and toward a rear end of the tool body.

\* \* \* \* \*